United States Patent [19]

Sasaki et al.

[11] Patent Number: 4,775,712

[45] Date of Patent: Oct. 4, 1988

[54] THERMOPLASTIC POLYESTER RESIN COMPOSITION

[75] Inventors: Isao Sasaki, Hiroshima; Akira Yanagase; Masafumi Hongo, both of Otake, all of Japan

[73] Assignee: Mitsubishi Rayon Co., Ltd., Tokyo, Japan

[21] Appl. No.: 2,922

[22] Filed: Jan. 13, 1987

[30] Foreign Application Priority Data

Jan. 16, 1986 [JP] Japan ..................... 61-6819

[51] Int. Cl.$^4$ .................. C08L 83/04; C08L 67/02
[52] U.S. Cl. ..................... 524/504; 525/446; 524/513
[58] Field of Search ............ 524/504; 525/446

[56] References Cited

U.S. PATENT DOCUMENTS

| | | | |
|---|---|---|---|
| 4,013,613 | 3/1977 | Abolins et al. | 525/446 |
| 4,337,192 | 6/1982 | Campbell | 524/539 |
| 4,443,581 | 4/1984 | Robeson et al. | 525/446 |
| 4,661,546 | 4/1987 | Abu-Isa et al. | 524/539 |

FOREIGN PATENT DOCUMENTS 0142336 5/1985 European Pat. Off. .
2376189 7/1978 France .

*Primary Examiner*—Lewis T. Jacobs
*Attorney, Agent, or Firm*—Cushman, Darby & Cushman

[57] ABSTRACT

A thermoplastic polyester resin composition capable of providing a molded article superior in impact resistance, heat resistance, cold resistance, and weather resistance, which comprises a blend of 10 to 80% by weight of a thermoplastic polyester (A), 5 to 55% by weight of a polyorganosiloxane-based graft copolymer (B) obtained by graft-polymerizing 95 to 10% by weight of at least one vinyl monomer onto 5 to 90% by weight of a polyorganosiloxane rubber which exhibits a degree of swelling of 3.0 to 15.0 measured in toluene at 25° C. and contains a graft-linking agent, 5 to 55% by weight of a thermoplastic polyester elastomer (C), and 0 to 60% by weight of a filler (D), wherein the total amount of the components (A) to (D) is 100% by weight.

6 Claims, No Drawings

THERMOPLASTIC POLYESTER RESIN COMPOSITION

BACKGROUND OF THE INVENTION

1. Field of the Invention

The present invention relates to a thermoplastic polyester resin composition which provides molded articles superior in impact resistance, heat resistance, cold resistance, and weather resistance.

2. Description of the Prior Art

Thermoplastic polyester, e.g. polyalkylene terephthalates, having superior mechanical properties, heat stability, weather resistance, electrical insulation properties, etc., are in use over extensive fields including electrical or electronic components, automotive parts, and so forth. However, their applications are considerably restricted because they are inferior in impact resistance, especially when notched. To automotive exterior and interior materials and housings of large electronic equipments, applications of these thermoplastic polyester resins have been investigated to take full advantage of their superior mechanical and thermal properties, but such application cannot be enough developed today because of their insufficient impact resistance and cold resistance. Various methods are proposed for improving the impact resistance of these thermoplastic polyester resins and are successful to some extent in this improvement but sacrifice other properties of the resins, so that such modified resins have found no plenty of practical applications. For instance, although the impact resistance of thermoplastic polyesters is improved by blending them with a diene rubber-modified resin, the heat stability and weather resistance, on the contrary, are deteriorated thereby to large extents. On the other hand, the blending with an acrylic rubber-modified resin results in slightest deterioration of the weather resistance but is little effective in improving the impact resistance at low temperatures. Olefin copolymers are also effective in improving the impact resistance of thermoplastic polyesters, but present problems such that the blending of such copolymers lowers other mechanical properties of the polyester and their dispersibility is poor, causing delamination. Hence, olefin copolymers also cannot be used for the blending.

SUMMARY OF THE INVENTION

The present inventors made intensive studies for the purpose of providing a method by which thermoplastic polyesters can be improved in impact resistance while maintaining their inherent superior heat stability, weather resistance, etc. As a result, it has been found that molding compounds markedly improved in impact resistance and superior in heat stability and weather resistance can be obtained by blending thermoplastic polyesters with both a copolymer produced by highly efficient graft polymerization of a vinyl monomer onto a polyorganosiloxane and a thermoplastic polyester elastomer. Based on this finding, the present invention has been accomplished.

DETAILED DESCRIPTION OF THE INVENTION

According to the invention, there is provided a thermoplastic polyester resin composition comprising a blend of 10 to 80% by weight of a thermoplastic polyester (A), 5 to 55% by weight of a polyorganosiloxane-based graft copolymer (B) obtained by graft-polymerizing 95 to 10% by weight of at least one vinyl monomer onto 5 to 90% by weight of a polyorganosiloxane rubber which exhibits a degree of swelling of 3.0 to 15.0 measured in toluene at 25° C. and contains a graft-linking agent, 5 to 55% by weight of a thermoplastic polyester elastomer (C), and 0 to 60% by weight of a filler (D), wherein the total amount of the components (A) to (D) is 100% by weight.

The composition of the invention is superior in heat stability, impact resistance, specially impact resistance at low temperatures, and weather resistance and its hardness can be varied from hard to soft by altering the blending proportions of the components (A), (B), and (C). The composition, superior specially in impact resistance, can be molded into ultrahigh-impact resistant articles exhibiting Izod impact strengths of at least 50 kg.cm/cm of ¼-in.thick notched test specimen at 23° C.

Thermoplastic polyester (A) for use in the invention is constituted mainly of an aromatic dicarboxylic acid of 8 to 22 carbon atoms and an alkylene glycol, cycloalkylene glycol, or aralkylene glycol of 2 to 22 carbon atoms and in certain cases, may contain a smaller amount of an aliphatic dicarboxylic acid, e.g. adipic acid or sebacic acid, and/or a polyalkylene glycol such as polyethylene glycol, polytetramethylene glycol, or the like in an amount of up to 5% by weight based on the thermoplastic polyester itself. Particularly preferred polyesters are polyethylene terephthalate and polytetramethylene terephthalate. These thermoplastic polyesters may be used alone or in combination.

In the invention, the content of thermoplastic polyester (A) based on the total amount of the components (A) to (D) is from 10 to 80%, preferably from 40 to 80%, by weight. Contents thereof departing from the above range tend to hardly give the intended resin composition of the invention.

Polyorganosiloxane-based graft copolymer (B) for use in the invention is obtained by graft-polymerizing 95 to 10% by weight of at least one vinyl monomer onto 5 to 90% by weight of a polyorganosiloxane rubber. The organosiloxane rubber is composed of three components of an organosiloxane, a graft-linking agent, and a crosslinking agent.

The organosiloxane is in cyclic form and includes various cyclic organosiloxanes in the form of three- or more-membered ring, preferably of three- to six-membered ring. Such organosiloxanes include, for example, hexamethyl cyclotrisiloxane, octamethyl cyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. These may be used alone or in combination. The organosiloxane is used in amounts of 60 to 99.8% by weight based on the whole polyorganosiloxane rubber component.

The graft-linking agent used herein is a compound capable of forming a unit represented by any of the following formulae:

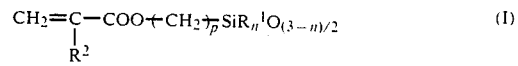  (I)

  (II) and

  (III)

wherein; $R^1$ denotes methyl, ethyl, propyl, or phenyl; $R_2$ denotes hydrogen or methyl; n denotes a number of 0, 1, or 2; and p denotes a number of 1 to 6. In particular, (meth)acryloyloxysiloxanes, capable of forming a unit of formula (I), are preferable in that they give high graft efficiency and hence permit effective formation of graft chains, thus favoring the impact resistance. Methacryloyloxysiloxanes are most preferable. Examples of such methacryloyloxysiloxanes are β-methacryloyloxyethyldimethoxymethylsilane, γ-methacryloyloxypropylmethoxydimethylsilane, γ-methacryloyloxypropyldimethoxy methylsilane, γ-methacryloyloxypropyltrimethoxysilane, γ-methacryloyloxypropylethoxydiethylsilane, γ-methacryloyloxypropyldiethoxymethylsilane, and δ-methacryloyloxybutyldiethoxymethylsilane.

The graft-linking agent is added in an amount of 0.1 to 20%, preferably 0.5 to 10%, by weight based on the whole polyorganosiloxane rubber component. When the addition amount is less than 0.1% by weight, the graft polymerization occurs insufficiently and hence the polyorganosiloxane-based graft copolymer will be hardly compatible with the thermoplastic polyester which is a hard component. When the amount exceeds 20% by weight, the percentage of grafting increases but the polymerization degree of the resulting graft copolymer or the grafted chain length tends to decrease undesirably.

The crosslinking agent is selected from those of trifunctional and tetrafunctional silane crosslinking agents, for example, trimethoxymethylsilane, triethyoxyphenylsilane, tetramethoxysilane, tetraethoxysilane, tetra-n-propoxysilane, and tetrabutoxysilane. Of these silane crosslinking agents, preferred are tetrafunctional crosslinking agents and particularly preferred is tetraethoxysilane. The crosslinking agent is used in an amount of 0.1 to 40% by weight based on the whole polyorganosiloxane rubber component. This amount should be chosen so that the degree of swelling of the resulting polyorganosiloxane rubber (the ratio by weight of toluene absorbed by polyorganosiloxane when it is saturated with toluene at 25° C.) will be within the range of 3.0 to 15.0. When the degree of swelling is less than 3.0, that is, the amount of crosslinking agent is too large, the polyorganosiloxane will not exhibit enough rubber elasticity. When the degree of swelling exceeds 15.0, the polyorganosiloxane cannot hold its own shape.

A reason for preferring the tetrafunctional silane crosslinking agent to the trifunctional is that the former facilitates the control of the degree of swelling to within the above range.

The degree of swelling is determined in the following way: A prepared polyorganosiloxane latex is broken to coagulate by adding it to about from 3 to 5 times the volume thereof of isopropyl alcohol with stirring, thereby recovering the organosiloxane polymer. The thus obtained polymer is washed with water, and then dried under reduced pressure at 80° C. for 10 hours. Thereafter, about 1 g of the polymer is precisely weighed out, and immersed in about 30 g of toluene at 25° C. for 100 hours to swell with toluene. Then the extra toluene is removed by decantation. The swelled polymer is weighed precisely, and dried under reduced pressure at 80° C. for 16 hours to evaporate and remove the absorbed toluene, and the resulting polymer is weighed again precisely. The degree of swelling is calculated according to the following equation:

$$\text{Degree of swelling} = \frac{(\text{Weight of swelled polymer}) - (\text{Weight of dry polymer})}{(\text{Weight of dry polymer})}$$

Polymerization for the polyorganosiloxane rubber can be carried out according to the methods described in the specifications for example, U.S. Pat. Nos. 2,891,920 and 3,294,725. In the present invention, the polyorganosiloxane is preferably produced, for instance, a mixed solution of the organosiloxane, graftlinking agent, and crosslinking agent is shear-mixed with water in the presence of an emulsifier such as a sulfonic acid type emulsifier such as alkylbenzenesulfonic acid, alkylsulfonic acid, or the like by using, for example, a homogenizer. Alkylbenzenesulfonic acid is best suited since it acts as an emulsifier and at the same time as a polymerization initiator. In this case, the joint use of a metal salt of alkylbenzenesulfonic acid or a metal salt of alkylsulfonic acid is preferable since it is effective in maintaining the polymer stable during the graft polymerization.

Suitable vinyl monomers for graft polymerization onto the polyorganosiloxane rubber include: aromatic alkenyl compounds such as styrene, α-methylstyrene, and vinyltoluene; methacrylates such as methyl methacrylate and 2-ethylhexyl methacrylate; acrylates such as methyl acrylate, ethyl acrylate and butyl acrylate; vinyl cyanide compounds such as acrylonitrile and methacrylonitrile; ethylene, propylene, butadiene, isoprene, chloroprene, vinyl acetate, vinyl chloride, vinylidene chloride, allyl methacrylate, triallyl isocyanurate, ethylene dimethacrylate, and mixtures of these monomers.

The vinyl monomer and the polyorganosiloxane rubber are used in respective proportions of 95 to 10% by weight and 5 to 90% by weight. When the proportion of the polyorganosiloxane rubber is less than 5% by weight, the impact resistance of the resin composition of the present invention is not sufficiently high. When the proportion of the polyorganosiloxane rubber exceeds 90% by weight, the effect of the grafting will not be exhibited.

The polyorganosiloxane-based graft copolymer can be obtained by the technique of radical polymerization of a vinyl monomer onto a polyorganosiloxane rubber in latex form prepared by the ordinary emulsion polymerization method. It is desirable that the ratio of the grafted vinyl monomer to the whole polymerized vinyl monomer, viz. graft efficiency be approximated to 100% as far as possible. In this respect, the polyorganosiloxane-based graft copolymer is preferred to contain a (meth)acryloyloxysiloxane unit represented by the above-mentioned formula (I) derived from a graftlinking agent.

In the present invention, the content of the polyorganosiloxane-based graft copolymer (B) based on the total amount of the components (A) to (D) is from 5 to 55%, preferably from 10 to 40%, by weight. When this content is less than 5% by weight, stable formation of strands by extrusion of the resin composition will be difficult. When the content of the polyorganosiloxane-based graft copolymer (B) exceeds 55% by weight, the heat resistance of the resin composition is undesirably lowered since the content of the thermoplastic polyester (A), which imparts the heat resistance, is decreased.

Thermoplastic polyester elastomer (C) for use in the present invention is a block copolymer made by bonding a crystalline aromatic polyester as a hard segment component to an aliphatic polyester or polyether serving as a soft segment component. Suitable crystalline aromatic polyesters for use herein include polyethylene terephthalate and polytetramethylene terephthalate and suitable aliphatic polyesters include polylactone and polyadipate. An example of particularly preferred thermoplastic polyester elastomers is a block copolymer constructed of polytetramethylene terephthalate serving as a hard segment component and polytetramethylene ether glycol serving as a soft segment component. While the copolymerization ratio of polytetramethylene terephthalate to polyteramethylene ether glycol can be diversified, the impact resistance increases with an increase in the content of polytetramethylene ether glycol. The soft segment component in the polyester elastomer and the polyorganosiloxane-based graft copolymer relate intimately to the shock absorbing power of the present resin composition. If the resin composition is devoid of either of the two, the shock absorbing power will drop to a great extent. Accordingly, the content of the thermoplastic polyester elastomer (C) in the present resin composition is from 5 to 55%, preferably from 5 to 40%, by weight. When this content is less than 5% by weight, the resin composition may not exhibit enough impact resistance since the composition lacks the soft segment component which must share with the polyorganosiloxane-based graft copolymer in shock absorption. When the content of the elastomer (C) exceeds 55% by weight, the content of the thermoplastic polyester (A) that provides the heat resistance decreases consequently and hence the heat resistance of the resin composition lowers undesirably.

The resin composition of the present invention is obtained by blending thermoplastic polyester (A), polyorganosiloxane-based graft copolymer (B), thermoplastic polyester elastomer (C), and filler (D) in proportions of 10 to 80%, 5 to 55%, 5 to 55%, and 0 to 60%, respectively, by weight based on the weight of the whole resin composition, wherein the total amount of the components (A) to (D) is 100% by weight. Desirably, this blend is melt-mixed and then pelletized.

Filler (D) may be of various kinds and shapes including fibrous, spherical, flaky, and amorphous granular and powdery, natural or synthetic fillers, for example, glass fiber, carbon fiber, aramid fiber, metallic fiber, asbestos, whisker, glass beads, glass flakes, calcium carbonate, talc, mica, aluminum oxide, magnesium hydroxide, boron nitride, beryllium oxide, calcium silicate, clay, and metal powders. These fillers (D) have effects of reinforcing mechanical properties, specially rigidity, and heat resistance and may be used alone or in combination in proportions of 0 to 60% by weight based on total amount of the components (A) to (D).

While polyester resins containing reinforcing fillers are well known, the addition of fillers often brings about the deterioration of impact resistance. Since the reinforced resin composition of the present invention exhibits higher impact resistance and heat resistance, reinforcing fillers can be utilized effectively.

The resin composition of the invention may contain, if necessary, additives such as; dyes or pigments, light or heat stabilizers; known flame retardants, e.g. brominated epoxy compounds, brominated polycarbonate, decabromodiphenyl ether, and antimony oxide; nucleating agents; miscellaneous modifiers; and mold-release compound, e.g. waxes.

The present invention is illustrated in more detail with reference to the following examples. In the following descriptions, parts are all by weight.

REFERENCE EXAMPLE 1

Preparation of polyorganosiloxane latex I

A mixture of 3.0 parts of tetraethoxysilane, 1.0 part of γ-methacryloyloxypropyldimethoxymethylsilane, and 96.0 parts of octamethylcyclotetrasiloxane was added to 300 parts of distilled water containing 1.0 part of dodecylbenzenesulfonic acid. After preliminary stirring in a homomixer at a revolution of 10000 rpm, the mixture was emulsified by passing it twice through a homogenizer under a pressure of 300 kg/cm$^2$, giving an organosiloxane latex. This latex was poured into a separable flask equipped with a condenser and a stirrer, and was heated with stirring at 85° C. for 4 hours and then cooled and left standing at 5° C. for 24 hours. This latex was neutralized with aqueous NaOH to pH 7.2, thus completing the polymerization to yield a polyorganosiloxane latex I. Polymerization yield: 91.2%; Solid content: 22.74 wt %; Degree of swelling: 7.4; Average particle diameter: 0.150 μm.

REFERENCE EXAMPLE 2

Preparation of polyorganosiloxane latex II

A mixture of 3.0 parts of tetraethoxysilane, 2.0 parts of γ-mercaptopropyldimethoxymethylsilane, and 95 parts of octamethylcyclotetrasiloxane was emulsified and polymerized according to the procedure of Reference Example 1. The resulting latex was neutralized with aqueous NaOH to pH 6.8, yielding a polyorganosiloxane latex II. Polymerization yield: 90.8%. Solid content: 22.64 wt %; Degree of swelling: 6.9; Average particle diameter: 0.156 μm.

REFERENCE EXAMPLE 3

Preparation of polyorganosilane latex III

A mixture of 3.0 parts of tetraethoxysilane, 2.0 parts of tetravinyltetramethylcyclotetrasiloxane, and 95 parts of octamethylcyclotetrasiloxane was emulsified and polymerized according to the procedure of Reference Example 1. The resulting latex was neutralized with aqueous NaOH to pH 7.0, yielding a polyorganosiloxane latex III. Polymerization yield: 91.6%; Solid content: 22.8 wt %; Degree of swelling: 7.3; Average particle diameter: 0.152 μm.

REFERENCE EXAMPLE 4

Preparation of polyorganosiloxane-base graft copolymers S-1, S-2 and S-3

Latexes I (263.9 parts, solid content 22.74 wt %), II (265.0 parts, solid content 22.64 wt %), and III (262.7 parts, solid content 22.84 wt %) prepared in Reference Examples 1, 2, and 3, respectively, were placed each in a separable flask equipped with a stirrer. After air replacement with nitrogen, each latex was heated to 70° C. and then 10 parts of acrylonitrile, 30 parts of styrene, and 0.08 part of tert-butyl hydroperoxide were added and the mixture was stirred for 30 minutes. Further a solution of 0.12 part of Rongalite, 0.0002 part of ferrous sulfate, and 0.0006 part of disodium ethylene diaminetetraacetate in 10 parts of water was added to initiate polymerization. Stirring was continued for 1 hour until the heat of polymerization was no longer generated, and thereafter the reaction temperature was maintained for 2 hours. Then the polymerization was ended by cooling the reaction mixture. The respective yields of graft copolymerizations were 97%, 98.4%, and 96.8% the respective percentages of grafting 48%, 21%, and 18%, and the respective graft efficiencies 72%, 31.5%, and 27%. The obtained latexes were each added dropwise to a hot aqueous solution of 5 parts of calcium chloride dihydrate to coagulate the polymer, which was then separated and dried. Thus, dry powders of graft copolymers S-1, S-2, and S-3 were obtained.

EXAMPLES 1–11 AND COMPARATIVE sured on ¼-in. thick notched test specimens in accordance with ASTM D-256. These test methods were applied to all the following examples and Comparative examples.

Results shown in Table 1 prove that resin compositions of the present invention provide molded articles excellent in impact resistance. It is also revealed that when the content of polytetramethylene terephthalte in the resin composition is relatively low as in Example 11. soft molding materials giving high impact resistance can be obtained though the Rockwell hardness thereof is slightly lowered.

TABLE 1

| | Mixing proportion of each component in resin composition | | | | |
|---|---|---|---|---|---|
| | Polytetra-methylene terephthalate (wt %) | Polyorgano-siloxane-based graft copolymer (S-1)(wt %) | Thermoplastic polyester elastomer (wt %) | Rockwell hardness (R scale) | Izod impact strength, notched 23° C. (kg · cm/cm) |
| Example 1 | 80 | 10 | 10 | 100 | 26 |
| Example 2 | 70 | " | 20 | 93 | 31 |
| Example 3 | " | 20 | 10 | 90 | 55 |
| Example 4 | 60 | 10 | 30 | 82 | 35 |
| Example 5 | " | 20 | 20 | 76 | 59 |
| Example 6 | " | 30 | 10 | 71 | 53 |
| Example 7 | 50 | 10 | 40 | 65 | 54 |
| Example 8 | " | 20 | 30 | 63 | 62 |
| Example 9 | " | 30 | 20 | 58 | 65 |
| Example 10 | " | 40 | 10 | 55 | 64 |
| Example 11 | 30 | " | 30 | 43 | 56 |
| Comparative Example 1 | 80 | 20 | — | 102 | 9.5 |
| Comparative Example 2 | " | 18 | 2 | 95 | 11 |
| Comparative Example 3 | " | — | 20 | 105 | 9 |
| Comparative Example 4 | " | 2 | 18 | Not measured since strand formation was impossible. | Not measured since strand formation was impossible. |
| Comparative Example 5 | 60 | 40 | — | 72 | 16 |

EXAMPLES 1–5

A polytetramethylene terephthalate having an intrinsic viscosity [η] of 1.05, polyorganosiloxane-based graft copolymer S-1, and thermoplastic polyester elastomer (block copolymer of polytetramethylene terephthalate and polytetramethylene ether glycol, hard segment content: 30 wt %) were blended in proportions as shown in Table 1. Each blend was fed into a 30-mmφ vent-type single screw extruder, melt-mixed at a cylinder temperature of 230° C., and formed into pellets. After drying, the obtained pellets were injection molded at a cylinder temperature of 230° C. and a mold temperature of 60° C. to prepare specimens for different tests. Results of evaluting various physical properties of these test specimens are shown in Table 1. The Rockwell hardness was measured in accordance with ASTM D-785 (R scale) and the Izod impact strength was mea-

EXAMPLES 12–14

According to the procedure of Example 3 but using different thermoplastic polyester elastomers as shown in Table 2, resin compositions were prepared and pelletized and test specimens were molded from these pellets and tested for various physical properties. Results thereof together with those of Example 3 are shown in Table 2.

It is revealed from Table 2 that in the present invention, various kinds of thermoplastic polyester elastomers can be used, of which particularly preferred are those produced by using polytetramethylene terephthalate as a hard segment component and polytetramethylene ether glycol as a soft segment component and those constituted of larger amounts of soft segment component tend to provide higher impact resistance.

TABLE 2

| | Thermoplastic polyester elastomer | | | | Rockwell hardness (R scale) | Izod impact strength, notched 23° C. (kg · cm/cm) |
|---|---|---|---|---|---|---|
| | Hard segment component | | Soft segment component | | | |
| | Name | Unit content | Name | Unit content | | |
| Example 3 | Polytetra-methylene terephthalate | 30 wt % | Polytetra-methylene ether glycol | 70 wt % | 90 | 55 |
| Example 12 | Polytetra-methylene | 50 wt % | Polytetra-methylene ether | 50 wt % | 92 | 47 |

TABLE 2-continued

| | Thermoplastic polyester elastomer | | | | Rockwell hardness (R scale) | Izod impact strength, notched 23° C. (kg · cm/cm) |
| --- | --- | --- | --- | --- | --- | --- |
| | Hard segment component | | Soft segment component | | | |
| | Name | Unit content | Name | Unit content | | |
| Example 13 | Polytetra-methylene terephthalate | 70 wt % | Polytetra-methylene ether glycol | 30 wt % | 96 | 43 |
| Example 14 | Polytetra-methylene terephthalate | 50 wt % | Polycaprolactone glycol | 50 wt % | 93 | 44 |

EXAMPLES 15 AND 16

Relations between physical properties of the present resin composition and the kind of graft-linking agent used in the production of the polyorganosiloxane-based graft copolymer were examined by using graft copolymers S-1, S-2, and S-3 prepared in Reference Example 4.

That is, resin compositions, pellets thereof, and test specimens thereof were prepared according to the procedure of Example 3 but using polyorganosiloxane-based graft copolymers S-2 and S-3 in place of S-1. These specimens were tested for various physical properties. Results thereof are shown in Table 3.

As can be seen by comparing Table 2 (Example 3) with Table 3, graft copolymer S-1, which was prepared by using γ-methacryloyloxypropyldimethoxymethylsilane as the graft-linking agent, provides better impact resistance to the blend resin composition than do graft copolymers S-2 and S-3, which were prepared by γ-mercaptopropyldimethoxymethylsilane and tetravinyltetramethylcyclotetrasiloxane as the respective graft-linking agents.

TABLE 3

| | Mixing proportion of each component in resin composition | | | Rockwell hardness (R scale) | Izod impact strength, notched 23° C. (kg · cm/cm) |
| --- | --- | --- | --- | --- | --- |
| | Polytetra-methylene terephthalate | Polyorganosiloxane-based graft copolymer | Thermoplastic polyester elastomer | | |
| | late | Designation (wt %) | (wt %) | | |
| Example 15 | 70 | S-2    20 | 10 | 91 | 37 |
| Example 16 | " | S-3    " | " | 88 | 31 |

EXAMPLES 17-20 AND COMPARATIVE EXAMPLES 6 AND 7

Tests were made to examine relations between physical properties of resin compositions and crosslinking densities, i.e. degree of swelling of polyorganosiloxane rubbers of polyorganosiloxane-based graft copolymers used in the resin compositions.

Polyorganosiloxane latexes were prepared according to the procedure of Reference Example 1 but using 0.03, 0.3, 1.0, 10.0, 20.0, and 45.0 parts of tetraethoxysilane severally, 1.0 part of γ-methacryloyloxypropyldimethoxy methylsilane in all of these cases, and the remainder of octamethylcyclotetrasiloxane in each case. (Total of siloxanes used in each case is 100 parts.) Using these polyorganosiloxane latexes, polyorganosiloxane-based graft copolymers S-4 to S-9 were prepared according to the procedure of Reference Example 4. Degrees of swelling of the above polyorganosiloxane rubbers prepared by using various amounts of tetraethoxysilane are shown in Table 4.

TABLE 4

| Polyorganosiloxane-based graft copolymer (designation) | Content of tetra-ethoxy silane in polyorganosiloxane rubber (wt %) | Degree of swelling of polyorgano-siloxane rubber |
| --- | --- | --- |
| S-4 | 0.03 | 22 |
| S-5 | 0.3 | 14 |
| S-6 | 1.0 | 10 |
| S-7 | 10.0 | 5.2 |
| S-8 | 20.0 | 4.3 |
| S-9 | 45.0 | 2.6 |

According to the procedure of Example 3 but using severally the above polyorganosiloxane-based graft copolymers S-4 to S-9 in place of S-1, resin compositions were prepared and pelletized and test specimens were molded from these pellets and tested for various physical properties. Results thereof are shown in Table 5.

As can be seen from Table 5, polyorganosiloxane-based graft copolymers from polyorganosiloxane rubbers which have degrees of swelling in the range of 3.0 to 15.0 give molded articles of resin compositions exhibiting superior physical properties.

TABLE 5

| | Mixing proportion of each component in resin composition | | | Rockwell hardness (R scale) | Izod impact strength, notched 23° C. (kg · cm/cm) |
| --- | --- | --- | --- | --- | --- |
| | Polytetra-methylene terephthalate (wt %) | Polyorganosiloxane-based graft copolymer Designation  (wt %) | Thermoplastic polyester elastomer (wt %) | | |
| Example 17 | 70 | S-5    20 | 10 | 84 | 41 |
| Example 18 | " | S-6    " | " | 87 | 47 |
| Example 19 | " | S-7    " | " | 92 | 54 |

TABLE 5-continued

| | Mixing proportion of each component in resin composition | | | Rockwell hardness (R scale) | Izod impact strength, notched 23° C. (kg · cm/cm) |
|---|---|---|---|---|---|
| | Polytetra-methylene terephtha-late (wt %) | Polyorganosiloxane-based graft copolymer | | | |
| | | Designation | (wt %) | Thermoplastic polyester elastomer (wt %) | |
| Example 20 | " | S-8 | " | " | 93 | 38 |
| Comparative Example 6 | " | S-4 | " | " | 80 | 22 |
| Comparative Example 7 | " | S-9 | " | " | 93 | 18 |

EXAMPLES 21-23

Tests were made to examine relations between physical properties of the present resin composition and the kind of thermoplastic polyester used as a component of the resin composition.

Resin compositions, pellets thereof, and molded test specimens thereof were prepared according to the procedure of Example 3 except that a polytetramethylene terephthalate having an intrinsic viscosity [$\eta$] of 0.92 and a polyethylene terephthalate having an intrinsic viscosity [$\eta$] of 0.85 were used as shown in Table 6 in place of the polytetramethylene terephthalate having an intrinsic viscosity [$\eta$] of 1.05. In Examples 22 and 23, the extrusion and injection molding of resin compositions were carried out at 275° C. Results of evaluating physical properties of these test specimens are shown in Table 6.

As can be seen from Table 6, resin compositions in molded article exhibit superior physical properties regardless of the polymerization degree of polytetramethylene terephthalate and the kind of thermoplastic polyester resin (as far as tested) and the impact resistance is also satisfactory at a temperature as low as −30° C.

EXAMPLE 24 AND COMPARATIVE EXAMPLE 8

A polytetramethylene terephthalate having an intrinsic viscosity [$\eta$] of 0.92, polyorganosiloxane-based graft copolymer S-1, thermoplastic polyester elastomer (the same as used in Examples 1-11), commercial 3-cm chopped glass fibers, and wollastonite powder passed through a 325-mesh screen were blended in two series of proportions as shown in Table 7 (in the comparative example, no graft copolymer or thermoplastic polyester elastomer was used). Each blend was fed into a 30-mm⌀ vent type single screw extruder, melt-mixed at a cylinder temperature of 230° C., and shaped into pellets. After drying, these pellets were injection molded at a cylinder temperature of 230° C. and a mold temperature of 60° C. to prepare flat plates (100 mm × 100 mm × 3 mm thick). These plates were tested for falling weight impact strength (JIS K 7211, under the condition of 0.5 kg falling weight, curvature of 25 R). Results of the test are shown in Table 7.

As is evident from Table 7, the resin composition of the present invention when containing fillers exhibit also superior impact resistance and filler loading does not deteriorate the weather resistance inherent in the polyester.

TABLE 6

| | Mixing proportion of each component in resin composition | | | | Rockwell hardness (R scale) | Izod impact strength, notched (kg · cm/cm) | |
|---|---|---|---|---|---|---|---|
| | Thermoplastic polyester | | Polyorgano-siloxane based graft copolymer (wt %) | Thermoplastic polyester elastomer (wt %) | | 23° C. | −30° C. |
| | Designation* | (wt %) | | | | | |
| Example 21 | PTMT | 70 | 20 | 10 | 85 | 43 | 15 |
| Example 22 | PTMT | 40 | " | " | 82 | 45 | 18 |
| | PET | 30 | | | | | |
| Example 23 | PET | 70 | " | " | 80 | 39 | 13 |

*PTMT: Polytetramethylene terephthalate
PET: Polyethylene terephthalate

TABLE 7

| | Mixing proportion of each component in resin composition | | | | | Falling weight impact strength (kg · cm) | Weather resistance Sunshine weather-O-Meter (63° C.) After 600-hr exposure |
|---|---|---|---|---|---|---|---|
| | Polytetra-methylene tere-phalate (wt %) | Polyorgano-siloxane-based graft copolymer S-1 (wt %) | Thermo-plastic polyester elastomer (wt %) | Filler | | | |
| | | | | Type | wt % | | |
| Example 24 | 50 | 15 | 7 | Glass fiber | 5 | 118 | Practically no yellowing |
| | | | | Woll-astonite | 23 | | |
| Comparative Example 8 | 72 | 0 | 0 | Glass fiber | 5 | 18 | Practically no yellowing |
| | | | | Woll- | 23 | | |

TABLE 7-continued

| Mixing proportion of each component in resin composition | | | | | Weather resistance | |
|---|---|---|---|---|---|---|
| Polytetra-methylene tere-phalate (wt %) | Polyorgano-siloxane-based graft copolymer S-1 (wt %) | Thermo-plastic polyester elastomer (wt %) | Filler Type | wt % | Falling weight impact strength (kg · cm) | Sunshine weather-O-Meter (63° C.) After 600-hr exposure |
| | | | astonite | | | |

According to the present invention, resin compositions which provide molded articles superior in impact resistance, heat resistance, cold resistance, and weather resistance can be obtained by blending a thermoplastic polyester resin with a specific polyorganosilane-based graft copolymer and a thermoplastic polyester elastomer, and if necessary, with a filler in proportions as stated above. Thus the invention achieves excellent effects.

What is claimed is:

1. A thermoplastic polyester resin composition comprising a blend of 10 to 80% by weight of a thermoplastic polyester (A), 5 to 55% by weight of a polyorganosiloxane-based graft copolymer (B) obtained by graft-polymerizing 95 to 10% by weight of at least one vinyl monomer onto 5 to 90% by weight of a polyorganosiloxane rubber, which rubber exhibits a degree of swelling of 3.0 to 15.0 measured in toluene at 25° C. and contains a graft-linking agent, wherein said graft-linking agent comprises a compound selected from the group consisting of:

$$H_2C=C-COO+CH_2)_{\overline{p}}SiR_n{}^1O_{(3-n)/2} \quad (I)$$
$$\phantom{H_2C=C}|\phantom{COO+CH_2)_{\overline{p}}SiR_n{}^1O_{(3-n)/2}}$$
$$\phantom{H_2C=C}R^2$$

$$CH_2=CH-Sir_n{}^1O_{(3-n)/2} \quad (II) \text{ and}$$

$$HS+CH_2)_{\overline{p}}SiR_n{}^1O_{(3-n)/2} \quad (III);$$

wherein; $R^1$ denotes methyl, ethyl, propyl, or phenyl; $R^2$ denotes hydrogen or methyl; n denotes a number of 0, 1, or 2; and p denotes a number of 1 to 6, 5 to 55% by weight of a thermoplastic polyester elastomer (C), and 0 to 60% by weight of a filter (D), wherein the total amount of the components (A) to (D) is 100% by weight.

2. The resin composition of claim 1, wherein the contents of thermoplastic polyester (A), polyorganosilane-based graft copolymer (B), thermoplastic polyester elastomer (C), and filler (D) are from 40 to 80% by weight, from 10 to 40% by weight, from 5 to 40% by weight, and from 0 to 60% by weight, respectively, and the total amount of the components (A) to (D) is 100% by weight.

3. The resin composition of claim 1 or 2, wherein the thermoplastic polyester is polyethylene terephthalate or polytetramethylene terephthalate.

4. The resin composition of claim 1 or 2, wherein the graft-linking agent is an organosiloxane compound capable of forming a unit represented by the formula (I)

$$H_2C=C-COO+CH_2)_{\overline{p}}SiR_n{}^1O_{(3-n)/2} \quad (I)$$
$$\phantom{H_2C=C}|\phantom{COO+CH_2)_{\overline{p}}SiR_n{}^1O_{(3-n)/2}}$$
$$\phantom{H_2C=C}R^2$$

wherein; $R^1$ denotes methyl, ethyl, propyl, or phenyl; $R^2$ denotes hydrogen or methyl; n denotes a number of 0, 1, or 2; and p denotes a number of 1 to 6.

5. The resin composition of claim 4, wherein the graft-linking agent is an organosilane compound capable of forming a unit represented by the formula (I) in which $R^2$ is methyl.

6. The resin composition of claim 1 or 2, wherein the thermoplastic polyester elastomer is a block copolymer obtained from the block copolymerization of polytetramethylene terephthalate as a hard segment component and polytetramethylene ether glycol as a soft segment component.

* * * * *